United States Patent [19]

Fowler et al.

[11] Patent Number: 5,457,884
[45] Date of Patent: * Oct. 17, 1995

[54] METHOD OF MANUFACTURING AN ARTICLE BY SUPERPLASTIC FORMING AND DIFFUSION BONDING

[75] Inventors: John O. Fowler; Brian Richardson, both of Lancashire, England

[73] Assignee: Rolls-Royce plc, Great Britain

[ * ] Notice: The portion of the term of this patent subsequent to Jun. 28, 2011 has been disclaimed.

[21] Appl. No.: 255,773

[22] Filed: Jun. 7, 1994

Related U.S. Application Data

[63] Continuation-in-part of Ser. No. 102,809, Aug. 6, 1993, Pat. No. 5,323,536.

[30] Foreign Application Priority Data

Aug. 14, 1992 [GB] United Kingdom ............... 9217276

[51] Int. Cl.$^6$ .............................. B23P 15/04; B23K 20/18
[52] U.S. Cl. ................. 29/889.72; 228/118; 228/157
[58] Field of Search ..................... 228/157, 118, 228/172; 29/889.72, 890.42

[56] References Cited

U.S. PATENT DOCUMENTS

| | | | |
|---|---|---|---|
| 4,043,498 | 8/1977 | Conn | 228/265 |
| 4,479,293 | 10/1984 | Miller et al. | 228/193 X |
| 4,882,823 | 11/1989 | Weisert et al. | 228/157 |
| 5,083,371 | 1/1992 | Leibfried et al. | 29/889.72 |
| 5,113,583 | 5/1992 | Jenkel et al. | 228/193 X |
| 5,269,058 | 12/1993 | Wiggs et al. | 29/889.72 |
| 5,323,536 | 6/1994 | Fowler et al. | 228/265 X |

FOREIGN PATENT DOCUMENTS

| | | |
|---|---|---|
| 0171344 | 2/1986 | European Pat. Off. . |
| 0448339 | 9/1991 | European Pat. Off. . |

Primary Examiner—Kenneth J. Ramsey
Attorney, Agent, or Firm—Cushman, Darby & Cushman

[57] ABSTRACT

A plurality of workpieces are assembled into a stack. Two of the workpieces are machined on one surface at predetermined positions from the edges of the workpieces. The workpieces are stacked so that the machined surfaces of the workpieces face away from each other. Two workpieces are provided with a stop off material on one of their surfaces to prevent diffusion bonding at predetermined positions. The edges of the workpieces are welded together and a pipe is welded to the stack to interconnect with the stop off material to form a sealed assembly. The workpieces are diffusion bonded together. The integral structure formed is heated and opposite ends of the integral structure are twisted relatively to contour the integral structure to a predetermined shape. The integral structure is heated and the machined portions on the workpieces are isothermally forged and then the twisted integral structure is internally pressurized to superplastically form one workpiece to produce an article, e.g. a fan blade.

36 Claims, 3 Drawing Sheets

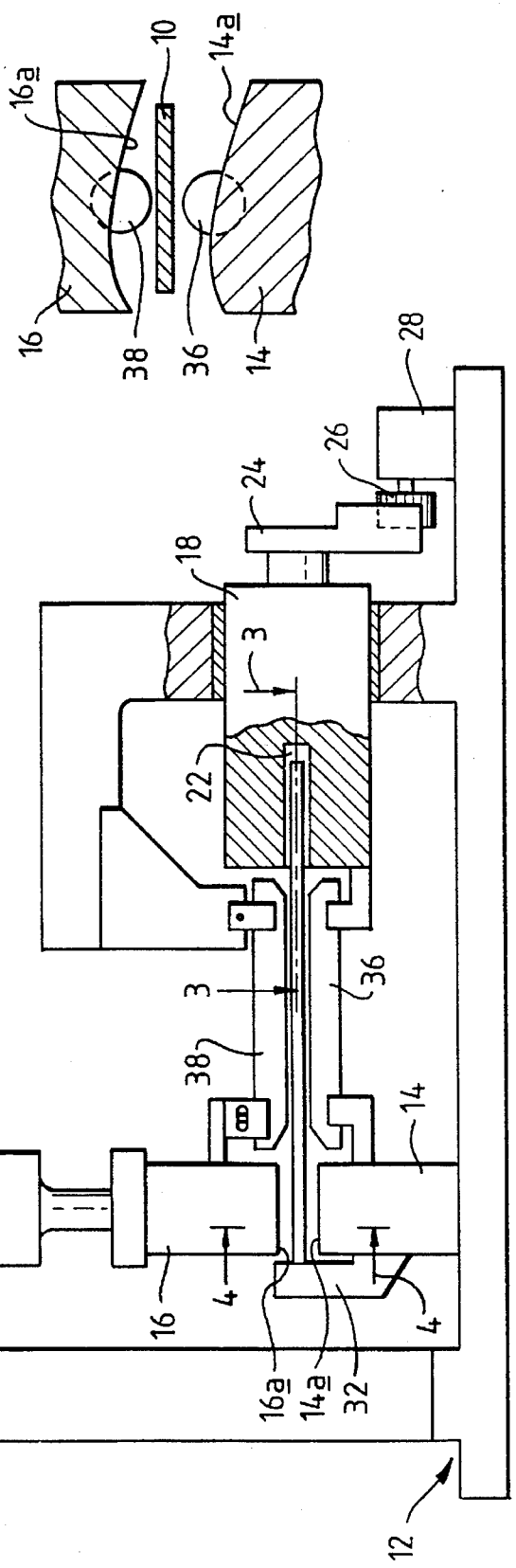

METHOD OF MANUFACTURING AN ARTICLE BY SUPERPLASTIC FORMING AND DIFFUSION BONDING

This is a continuation-in-part of application Ser. No. 08/102,809, filed Aug. 6, 1993 now U.S. Pat. No. 5,323,536.

FIELD OF THE INVENTION

The present invention relates to a method of manufacturing an article by superplastic forming and diffusion bonding.

BACKGROUND OF THE INVENTION

It is known to manufacture hollow metallic articles by superplastic forming and diffusion bonding workpieces. These workpieces include elementary metal, metal alloys, intermetallic materials and metal matrix composites. At least one of the workpieces must be capable of superplastic extensions.

In one known process the surfaces of the workpieces to be joined are cleaned, and at least one surface of one or more of the workpieces is coated in preselected areas with a material to prevent diffusion bonding. The workpieces are arranged in a stack and the edges of the workpieces are welded together, except where a pipe is welded to the outer workpieces, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is then evacuated, using the pipe, and the pipe is sealed. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface so that the interface effectively ceases to exist. The first pipe is removed and a second pipe is fitted to the diffusion bonded assembly at the position where the first pipe was located. The integral structure is located between appropriately shaped dies and is placed within an autoclave. The integral structure and dies are heated and pressurised fluid is supplied through the second pipe into the interior of the integral structure to cause at least one of the workpieces to be superplastically formed to produce an article matching the shape of the dies.

The superplastic forming and diffusion bonding process may be used to produce contoured articles for example fan blades, or fan duct outlet guide vanes, for gas turbine engines by twisting an integral structure formed by the diffusion bonding process before superplastically forming the integral structure. A procedure for twisting the integral structure before superplastic forming is disclosed in our prior UK patent application No. 9209464.8 filed on 1 May 1992, the contents of which are incorporated herein by reference.

A problem with the procedure disclosed in our earlier patent application, mentioned above, is that the contoured article produced by the superplastic forming and diffusion bonding process requires further operations to produce the finished article. In particular there are superfluous portions of material on the contoured article at regions which correspond to the leading edge and trailing edge of the finished fan blade, or outlet guide vane. This excess material is removed from the contoured article by rough machining to within about 1 mm of the final required dimensions of the leading edge and trailing edge regions of the finished fan blade, or outlet guide vane, and then by belt grinding to the final required shape and dimensions.

This process of removing excess material from the contoured article to produce the finished article is very labour intensive and inefficient. Furthermore there is a risk of removing too much material from the contoured article with the result that the finished article is rejected due to none conformance with dimensional constraints. If this occurs the expensive diffusion bonding and superplastic forming processes have been wasted.

SUMMARY OF THE INVENTION

The present invention seeks to provide a novel method of manufacturing a contoured article by superplastic forming and diffusion bonding which reduces, or overcomes, the above mentioned problems.

Accordingly the present invention provides a method of manufacturing an article by superplastic forming and diffusion bonding at least two workpieces comprising the steps of:

(a) forming a first workpiece which has a flat surface, (b) forming a second workpiece which has a flat surface, the first and second workpieces defining the outer profile of the finished article, (c) machining a portion of a surface of the first workpiece at a predetermined distance from at least a portion of the periphery of the first workpiece, the said surface being opposite to the flat surface of the first workpiece, (d) applying a stop off material to prevent diffusion bonding to preselected areas of at least one of the flat surfaces of at least one of the at least two workpieces, (e) assembling the at least two workpieces into a stack relative to each other so that the flat surfaces are in mating abutment, (f) applying heat and pressure across the thickness of the at least two workpieces to diffusion bond the at least two workpieces together in areas other than the preselected areas to form an integral structure, (g) heating the integral structure to a temperature at which the metal is plastic and internally pressurising the integral structure to break the adhesive bond between the stop off material and the at least one workpiece in the preselected areas and applying heat and pressure to the integral structure to isothermally forge the machined portion on the first workpiece which forms part of the integral structure to substantially produce the required finished peripheral shape and dimensions of the finished article, (h) heating the integral structure and internally pressurising it to cause the preselected areas of at least one of the workpieces to be superplastically formed to produce an article of predetermined shape, (i) finish machining the article to remove excess material from the isothermally forged peripheral shape to produce the finished article.

A portion of a surface of the second workpiece may be machined at a predetermined distance from at least a portion of the periphery of the second workpiece, the said surface being opposite to the flat surface of the second workpiece, applying heat and pressure on the integral structure to isothermally forge the machined portions on the first and second workpieces which form part of the integral structure to substantially produce the required finished peripheral shape and dimensions of the finished article.

Preferably after diffusion bonding the stack of workpieces and before internally pressurising the integral structure to break the adhesive bond, the integral structure is heated and loads are applied to opposite ends of the integral structure to twist one end relative to the other end to contour the integral structure to a predetermined shape.

Preferably after internally pressurising the integral structure to break the adhesive bond and before internally pressurising the integral structure to superplastically form at least one workpiece, the interior of the integral structure is sequentially evacuated and supplied with inert gas to remove oxygen from the interior of the integral structure.

Preferably the step of sequentially evacuating and supplying inert gas to the interior of the integral structure to remove oxygen is performed a plurality of times.

Preferably the breaking of the adhesive bond, the isothermal forging and the superplastic forming steps are performed in a single die.

Step (g) may include the applying of heat and pressure to the integral structure to isothermally forge the integral structure before internally pressurising the integral structure to break the adhesive bond.

Alternatively step (g) may include internally pressurising the integral structure to break the adhesive bond before applying heat and pressure to the integral structure to isothermally forge the integral structure.

The present invention also provides a method of manufacturing an article by superplastic forming and diffusion bonding at least two workpieces comprising the steps of:

(a) forming a first workpiece which has a flat surface, (b) forming a second workpiece which has a flat surface, the first and second workpieces defining the outer profile of the finished article, (c) machining a portion of a surface of the first workpiece at a predetermined distance from at least a portion of the periphery of the first workpiece, the said surface being opposite to the flat surface of the first workpiece, (d) applying a stop off material to prevent diffusion bonding to preselected areas of at least one of the flat surfaces of at least one of the at least two workpieces, (e) assembling the at least two workpieces into a stack relative to each other so that the flat surfaces are in mating abutment, (f) sealing the edges of the at least two workpieces together, except where a pipe is to be inserted, and joining a pipe to the stack to provide a sealed assembly, (g) sequentially evacuating the interior of the sealed assembly and supplying inert gas to the interior of the sealed assembly through the pipe to remove oxygen from the interior of the sealed assembly, (h) placing the sealed assembly in an oven while continuously evacuating the sealed assembly, (i) heating the sealed assembly while it is within the oven to evaporate volatile binder from the stop off material while continuously evacuating the sealed assembly to remove the volatile binder from between the at least two workpieces of the sealed assembly, (j) sealing the pipe, (k) applying heat and pressure across the thickness of the at least two workpieces to diffusion bond the at least two workpieces together in areas other than the preselected areas to form an integral structure, (l) heating the integral structure to a temperature at which the metal is plastic and internally pressurising the integral structure to break the adhesive bond between the stop off material and the at least one workpiece in the preselected areas and applying heat and pressure to the integral structure to isothermally forge the machined portion on the first workpiece which forms part of the integral structure to substantially produce the required finished peripheral shape and dimensions of the finished article, (m) heating the integral structure and internally pressurising it to cause the preselected areas of at least one of the workpieces to be superplastically formed to produce an article of predetermined shape, (n) finish machining the article to remove excess material from the isothermally forged peripheral shape to produce the finished article.

A portion of a surface of the second workpiece may be machined at a predetermined distance from at least a portion of the periphery of the second workpiece, the said surface being opposite to the flat surface of the second workpiece, applying heat and pressure to the integral structure to isothermally forge the machined portions on the first and second workpieces which form part of the integral structure to substantially produce the required finished peripheral shape and dimensions of the finished article.

Preferably after diffusion bonding the stack of workpieces and before internally pressurising the integral structure to break the adhesive bond, the integral structure is heated and loads are applied to opposite ends of the integral structure to twist one end relative to the other end to contour the integral structure to a predetermined shape.

Preferably, before the pipe is sealed, the sealed assembly is cooled whilst the sealed assembly is continuously evacuated.

Preferably after internally pressurising the integral structure to break the adhesive bond and before internally pressurising the integral structure to superplastically form at least one workpiece, the interior of the integral structure is sequentially evacuated and supplied with inert gas to remove oxygen from the interior of the integral structure.

Preferably the step of sequentially evacuating and supplying inert gas to the interior of the integral structure to remove oxygen is performed a plurality of times.

Preferably the edges of the workpieces are welded together.

Preferably the step of sequentially evacuating the interior of the sealed assembly and supplying inert gas to the interior of the sealed assembly through the pipe to remove oxygen from the interior of the sealed assembly is performed a plurality of times.

Where the workpieces are made of a titanium alloy, the workpieces are heated to a temperature equal to, or greater than, 850° C. and the pressure applied is equal to, or greater than, $20 \times 10^5$ Nm$^{-2}$ to diffusion bond the workpieces together to form an integral structure.

Preferably the workpieces are heated to a temperature between 900° C. and 950° C. and the pressure applied is between $20 \times 10^5$ Nm$^{-2}$ and $30 \times 10^5$ Nm$^{-2}$.

The integral structure is heated to a temperature equal to, or greater than, 850° C. to superplastically form the integral structure.

Preferably the integral structure is heated to a temperature between 900° C. and 950° C.

Preferably the integral structure is heated to a temperature of 800° C. for twisting the opposite ends of the integral structure.

Preferably before the opposite ends of the integral structure are twisted the integral structure is heated and a load is applied to one end of the integral structure to camber said end.

Preferably the integral structure is heated to a temperature of 920° C. and is isothermally forged at a pressure of up to $16 \times 10^6$ Nm$^{-2}$.

Preferably the machining of the surfaces of the first, or second, workpieces comprises milling, electrochemical machining, chemical machining or electro discharge machining.

Preferably the finish machining comprises cutting and finish grinding.

The article may be a vane manufactured from two workpieces by machining a first portion of the first workpiece at a predetermined distance from a first edge of the first workpiece, machining a second portion of the first workpiece at a predetermined distance from a second opposite edge of the first workpiece, machining a first portion of the second workpiece at a predetermined distance from a first edge of the second workpiece, machining a second portion of the second workpiece at a predetermined distance from a second opposite edge of the second-workpiece, assembling the first and second workpieces into a stack such that the flat surfaces are in abutment and the first edges of the workpieces are adjacent each other, the first edges of the workpieces correspond to the leading edge of the vane and the second edges of the workpieces correspond to the trailing edge of the vane.

The article may be a blade manufactured from three workpieces by machining a first portion of the first workpiece at a predetermined distance from a first edge of the first workpiece, machining a second portion of the first workpiece at a predetermined distance from a second opposite edge of the first workpiece, machining a first portion of the second workpiece at a predetermined distance from a first edge of the second workpiece, machining a second portion of the second workpiece at a predetermined distance from a second opposite edge of the second workpiece, assembling the first, second and third workpieces into a stack such that the flat surface of the first workpiece is in abutment with one flat surface of the third workpiece and the flat surface of the second workpiece is in abutment with an opposite flat surface of the third workpiece, the first edges of the workpieces are adjacent each other, the first edges of the workpieces correspond to the leading edge of the blade and the second edges of the workpieces correspond to the trailing edge of the blade.

Preferably the first or second workpieces may be machined centrally of the surface opposite to the flat surface to vary the mass distribution of the first or second workpiece.

Preferably the breaking of the adhesive bond, the isothermal forging and the superplastic forming steps are performed in a single die.

The integral structure may be internally pressurised to break the adhesive bond between the stop off material and the at least one workpiece in the preselected areas before the integral structure is isothermally forged.

Alternatively the integral structure may be isothermally forged before it is internally pressurised to break the adhesive bond between the stop off material and the at least one workpiece in the preselected areas.

The present invention also provides a method of manufacturing an article comprising the steps of:

(a) producing a plurality of stackable workpieces comprising at least first and second workpieces, the first and second workpieces each having at least one flat surface and a surface intended to form the outside of the finished article, any further workpieces in said plurality of workpieces having two flat surfaces for abutting flat surfaces on the other workpieces, (b) machining at least a portion of at least one of the surfaces intended to form the outside of the finished article to predefine an edge portion of the finished article, (c) applying a stop off material to preselected areas of preselected flat surfaces of the workpieces, (d) assembling the workpieces into a stack so that the flat surfaces of adjacent workpieces are in mating abutment, (e) applying heat and pressure across the stack of workpieces to diffusion bond the workpieces together in areas of the flat surfaces other than the preselected areas where the stop off was applied, thereby forming an integral structure, (f) heating the integral structure to a temperature at which the metal is plastic and internally pressurising the integral structure to break the adhesive bond between the stop off material and the at least one workpiece in the preselected areas and applying heat and pressure to the integral structure to isothermally forge the machined portion on the at least one of the surfaces of the workpieces intended to form the outside of the finished article which form part of the integral structure to substantially produce the required finished peripheral shape and dimensions of the finished article, (g) heating the integral structure and internally pressurising it to cause the preselected areas of at least one of the workpieces to be superplastically formed to produce an article of predetermined shape, (i) finish machining the article to remove excess material from the isothermally forged peripheral shape to produce the finished article.

Preferably the step of breaking the adhesive bond comprises supplying a predetermined volume of pressurised gas into the interior of the integral structure and monitoring the rate of pressure decay in the interior of the integral structure for rates of pressure decay greater than a predetermined value.

BRIEF DESCRIPTION OF THE DRAWINGS

The present invention will be more fully described by way of example with reference to the accompanying drawings, in which:

FIG. 1 is a diagrammatic view of an integral structure formed by diffusion bonding a stack of workpieces before and after twisting according to the present invention, FIG. 2 is a part cross-sectional view of a machine tool used for twisting the integral structure according to the present invention, FIG. 3 is a view on line 3—3 of FIG. 2, FIG. 4 is a view on line 4—4 of FIG. 2.

DETAILED DESCRIPTION OF THE INVENTION

Figure 5:
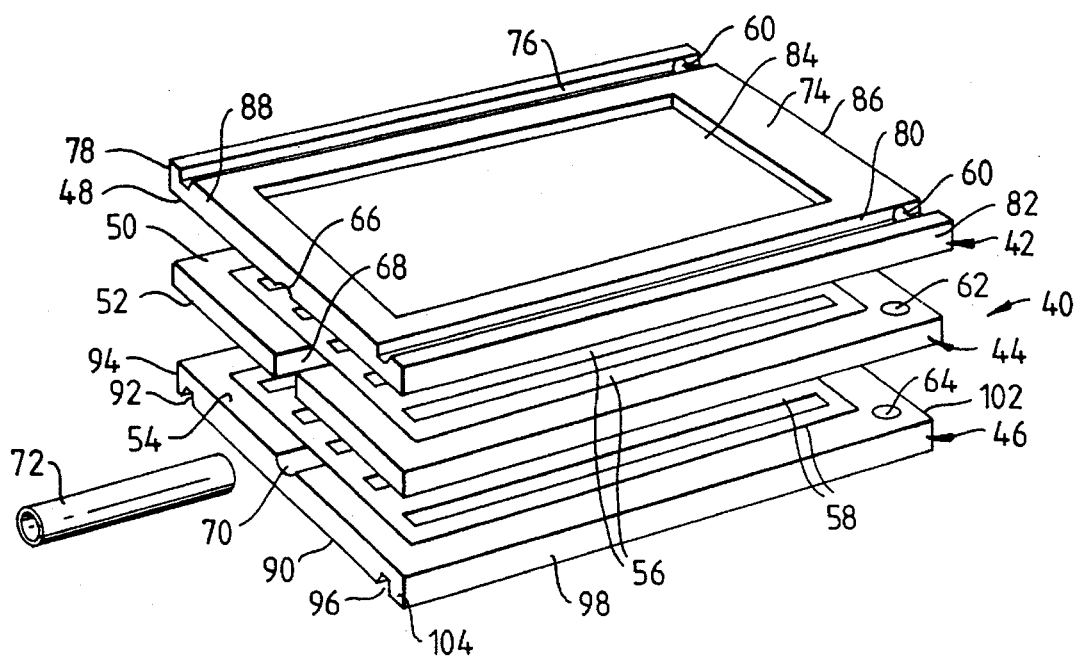
FIG. 5 illustrates an exploded view of a stack of workpieces which are superplastically formed and diffusion bonded to form an article according to the present invention.

In FIG. 5, three sheets of titanium alloy 42,44 and 46 are assembled into a stack 40. The sheets 42,44 and 46 have mating surfaces 48,50,52 and 54 which are flat.

Prior to assembling the sheets 42,44 and 46 into the stack 40, a first groove 76 is machined on a surface 74, opposite to the flat mating surface 48, at a predetermined distance from one edge 78 of the first sheet 42 and a second groove 80 is machined on the surface 74 at a predetermined distance from a second, opposite, edge 82 of the first sheet 42. The grooves 76 and 80 of the first sheet 42 correspond to what will be the leading edge and trailing edge of the fan blade produced by the following method. The grooves 76 and 80 are shaped to correspond roughly to the required shape of the leading and trailing edges of the fan blade. Also the first sheet 42 is machined in a region 84 centrally of the surface 74 and the central machined region 84 is spaced from the grooves 76 and 80. The central machined region 84 of the surface 74 is contoured to produce a variation in the mass distribution of the fan blade from leading edge to trailing edge and from root to tip by varying the depth of machining, ie, varying the thickness of the first sheet, across the central machined region 84 in the direction between the edges 78 and 82 and in the direction between the ends 86 and 88 of the first sheet 42.

Similarly a first groove 92 is machined on a surface 90, opposite to the flat mating surface 54, at a predetermined distance from a first edge 94 of the third sheet 46 and a second groove 96 is machined on the surface 90 at a predetermined distance from a second opposite edge 98 of the third sheet 46. The grooves 92 and 96 correspond to what will be the leading edge and trailing edge of the fan blade produced by the following method. The grooves 92 and 96 are shaped to correspond roughly to the required shape of the leading edge and trailing edge of the fan blade. The third sheet 46 is also machined in a region (not shown) centrally of the surface 90 and the central machined region is spaced from the grooves 92 and 96. The central machined region of the surface 90 is contoured to produce a variation in the mass distribution of the fan blade from leading edge to trailing edge and from root to tip by varying the depth of machining across the central machined region in the direction between the edges 94 and 98 and in the direction between ends 102 and 104 of the third sheet 46.

The machining of the grooves 76,80,92 and 96 and the central machined regions 84 of the first and third sheets 42 and 46 respectively is by milling, electrochemical machining, chemical machining, electrodischarge machining or any other suitable machining process.

After the grooves 76,80,92 and 96 and central machined regions 84 have been machined in the first and third sheets 42 and 46 respectively, the dimensions of the first and third sheets 42 and 46 are checked to ensure that the grooves 76,80,92 and 96 in the sheets 42 and 46 will produce the required near net shape at the leading and trailing edges of the finished fan blade. Thus any sheets not conforming to dimensional requirements are rejected before the expensive diffusion bonding and superplastic forming processes are performed.

The mating surfaces 48,50,52 and 54 of the sheets 42,44 and 46 are then prepared for diffusion bonding by chemical cleaning. One of the mating surfaces 48 and 50, in this example mating surface 50 has had a stop off material applied, and one of the mating surfaces 52 and 54, in this example mating surface 54, has had a stop off material applied. The stop off may comprise powdered yttria in a binder and solvent e.g., the stop off known as "Stopyt 62A" which is sold by an American company named GTE Service Corporation of 100 Endicott Street, Danvers, Mass. 10923, U.S.A.

The stop off material is applied in desired patterns 56 and 58, shown as the shaded areas in FIG. 5, by the known silk screen printing process. The desired patterns 56 and 58 of stop off material prevent diffusion bonding between preselected areas of the sheets 42,44 and 46. In this example the stop off is applied in straight lines, but it may be applied as dots or other suitable patterns depending on the particular article to be manufacture. The three sheets of titanium alloy 42,44 and 46 are then assembled into the stack 40. The sheet 42 has a pair of dowel holes 60 which are axially aligned with corresponding dowel holes 62 in sheet 44 and with corresponding dowel holes 64 in sheet 46 to ensure the correct positional relationship between the three sheets 42,44 and 46 in the stack 40. The sheets 42,44 and 46 are maintained in this positional relationship by a pair of dowels (not shown) which are inserted into the axially aligned dowel holes 60,62 and 64.

The sheets 42,44 and 46 of the stack 40 are placed together to trap an end of a pipe 72. In this example a groove 66 is machined on surface 48 of sheet 42, a slot 68 is machined through sheet 44 and a groove 70 is machined on surface 54 of sheet 46. The slot 68 in sheet 44 extends between the surfaces 50 and 52 to interconnect the pattern of stop off between sheets 42 and 44 with the pattern of stop off between sheets 44 and 46. The pipe 72 is positioned so as to project from between the three sheets 42,44 and 46. One end of the pipe 72 interconnects with the pattern of stop off material between the sheets 42 and 44 and also with the pattern of stop off material between sheets 44 and 46. In this example grooves 66,68 and 70 are machined in the sheets 42,44 and 46. On completion of the assembly in the manner described it is welded about its periphery so as to weld the edges of sheets 42 and 44 together, and so as to weld the edges of sheets 44 and 46 together. The pipe 72 is also welded around its periphery to the sheets 42,44 and 46. A sealed assembly is formed except for the inlet provided by the pipe 72.

It is of course possible to machine grooves on the mating surfaces of one pair of sheets to trap an end of a pipe, and to provide apertures, or slots, through one of the these sheets to interconnect with the stop off patterns between all the sheets. As a further alternative it is possible to machine grooves on each set of mating surfaces of the sheets to trap the end of a respective pipe. In this variant a number of pipes are required. In the last two possibilities it is possible to machine the grooves in one, or both, of the mating surfaces.

The pipe 72 is then connected to a vacuum pump which is used to evacuate the interior of the sealed assembly and then inert gas, for example argon, is supplied to the interior of the sealed assembly. This process of evacuating and supplying inert gas to the interior of the sealed assembly may be repeated several times in order to ensure that most, or substantially all, traces of oxygen are removed from the interior of the sealed assembly. The particular number of times that the interior of the sealed assembly is evacuated and purged with inert gas depends upon the size of the workpieces and upon the required integrity of the finished component. The smaller the traces of oxygen remaining, the greater the quality of the subsequent diffusion bond. The inert gas is supplied to pressurise the interior of the sealed assembly to atmospheric pressure.

The sealed assembly is evacuated and is placed into an oven. The sealed assembly is then heated to a temperature between 250° C. and 350° C. to evaporate the binder from the stop off material. During the baking out of the binder, the sealed assembly is continuously evacuated to remove the binder from between the sheets. After the binder has been removed, which is determined either by monitoring the binder levels in the gas extracted from the sealed assembly or by maintaining the sealed assembly at the temperature between 250° C. and 350° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surface of the sealed assembly.

The pipe 72 is then sealed so that there is a vacuum in the sealed assembly. The sealed assembly is then transferred carefully to an autoclave because the stop off is brittle and easily damaged. Alternatively a predetermined amount of binder may be left in the stop off material, so that the stop off is not too brittle, to enable the sealed assembly to be transferred to the autoclave without damage to the stop off.

The temperature in the autoclave is increased such that the sealed assembly is heated to a temperature greater than 850° C. and the argon pressure in the autoclave is raised to greater than 20 atmospheres, 294 pounds per square inch (20.26× $10^5$ Nm$^{-2}$) and held at that temperature and pressure for a predetermined time. Preferably the sealed assembly is heated to a temperature between 900° C. and 950° C. and the pressure is between 294 pounds per square inch (20.26×$10^5$ Nm$^{-2}$) and 441 pounds per square inch (30.39×$10^5$ Nm$^{-2}$). For example if the sealed assembly is heated to a temperature of 925° C. and the pressure is raised to 300 pounds per square inch the temperature and pressure are held constant for about two hours. The pressure is then reduced to ambient, diffusion bonding having been achieved and the sealed assembly, which is then an integral structure, is removed.

It is also possible to transfer the sealed assembly directly to the autoclave, immediately after the pipe 72 is sealed without the requirement to cool the sealed assembly to ambient temperature, however some cooling of the sealed assembly may occur.

The integral structure 10 is then placed into a twisting machine, as shown in FIGS. 1 to 4, which is described more fully in our UK Patent No. GB2073631B the contents of which are incorporated herein by reference. One end of the integral structure 10, an end which is subsequently to form the root portion of a blade, is located between a pair of relatively movable dies 14,16. The opposite end of the integral structure 10 is located in a slot 22 in a rotary member 18. The integral structure 10 is then heated to a temperature of 800° C., in the case of titanium, and a load is applied to the end of the integral structure 10 by the dies 14,16 in order to form a camber on the end of the integral structure gripped by the dies 14,16. After a camber has been formed at one end of the integral structure 10, the opposite end of the integral structure 10 is rotated by the rotary member 18 so as to twist the integral structure 10 into substantially the desired shape for the dies used during the superplastic forming process.

In some circumstances it may be necessary to hot creep form the twisted integral structure using the dies of a hot creep forming press to adjust the shape of the twisted integral structure to the desired shape for the dies used during the superplastic forming process. It is to be noted that the dies of the hot creep forming press are arranged to contact the twisted integral structure in regions which will subsequently be removed. Alternatively the twisted integral structure may be hot creep formed using the dies used during the superplastic forming process. During the hot creep forming process the integral structure is heated to a temperature of 740° C.

It is very important that the integral structure 10 is twisted before the argon is introduced into the integral structure 10, to break the adhesive grip brought about by the diffusion bonding pressure, in the areas containing the stop off. Twisting the integral structure 10 at this stage does not impair the structural integrity of the resulting finished article. Whereas twisting the integral structure 10 after the adhesive grip, brought about by diffusion bonding pressure, has been broken may result in impaired structural integrity of the resulting finished article.

The twisted integral structure is then placed into a forging apparatus which comprises a pair of suitably shaped dies. The shaped dies have contoured kiss faces which correspond substantially to the required finished shape of the leading and trailing edges of the fan blade. The twisted integral structure and forging apparatus are then heated to a suitable temperature and a suitable pressure is applied on the twisted integral structure, by the shaped dies of the forging apparatus, to isothermally form the twisted integral structure in the region of the grooves 76,80,92 and 96. In the case of titanium, the twisted integral structure is heated to a temperature of 920° C. and a load of up to 1 ton per square inch (15.43×$10^6$ Nm$^{-2}$) is applied to isothermally form the twisted integral structure.

The pipe 72 is removed and a second pipe is fitted to the twisted integral structure. The diffusion bonding process causes adhesion between the stop off 56,58 covered areas on the sheets 42,44,46. "Cracking" is the name given to the breaking of this adhesive bond and is a preliminary to the superplastic forming step. It is achieved by introducing argon at high pressure via the second pipe into the stop off areas 56,58.

In particular, the cracking operation is performed to ensure that the second pipe entry and the gas channel, defined by grooves 66,68,70, to which it connects, provide an open passageway and do not restrict pressurisation of the interior structure. The interior structure before cracking is of course defined by the stop off material.

Cracking may be carried out at room temperature, when the metal exhibits normal elastic properties. Care is taken to ensure that the extension which occurs due to pressurisation with the argon does not go beyond the elastic limit. Consequently, the structure regains its shape when the pressure is removed at the end of the step. This is known as a "cold crack" technique.

Alternatively, cracking can be carried out at the temperature required for superplastic forming. This is known as a "hot crack" technique. In this case, plastic deformation of the structure produced by pressurisation must be insufficient to cause "ballooning" and thinness of the material in and near the second pipe entry.

Whether a cold crack or a hot crack operation is performed is at the choice of the manufacturer and is dependent upon the degree of control of expansion of the structure which can be exercised during pressurisation. This will depend partly upon the geometric and material characteristics of the structures being pressurised and partly upon the fineness of control of pressurisation which is available.

Unavoidably, these will be, at least to some extent, matters of experimentation for each different configuration of structure it is desired to manufacture.

Of the two techniques, hot cracking is the more convenient because it can be performed within the superplastic forming dies as the first stage in the superplastic forming process. However, it should only be adopted if the manufacturer is confident that he can control the process so as to avoid excessive plastic deformation when pressurising the structure, because otherwise rupture of one or more of the sheets 42,44,46 can occur.

In both hot and cold cracking, the argon is introduced into the areas, within the twisted integral structure, containing the stop off in order to break the adhesive grip which the diffusion bonding pressure has brought about. The argon is carefully introduced to those areas which contain the stop off, and the argon seeps through the stop off and eventually reaches the opposing end of the twisted integral structure. In some internal structures the argon may initially be caused to travel between one pair of workpieces and on reaching the opposite end return to the inlet end between another pair of workpieces. In any event, the argon should preferably travel the whole length of the interior of the twisted integral structure such as to break the adhesive grip between the stop and the workpieces brought about during the diffusion bonding step.

Since the cracking operation is important for successful execution of the superplastic forming process, it will be further described below.

During cold cracking, a sequence of "pulses" of argon are introduced into the second pipe. Each pulse comprises a standard volume of gas at a high standard pressure and is introduced into the second pipe via a valve. After each pulse or a predetermined number of pulses, readings are taken of the pressure in the second pipe at regular intervals over a set period of time, and the decay of pressure in the second pipe is observed. Simultaneously the thickness of the stack in the region of the gas channel, 66,68,70, is measured to monitor the expansion due to the applied pressure. If pressure drop and expansion values over the set period are within predetermined ranges, the cracking process is known to be completed satisfactorily.

Figure 7:
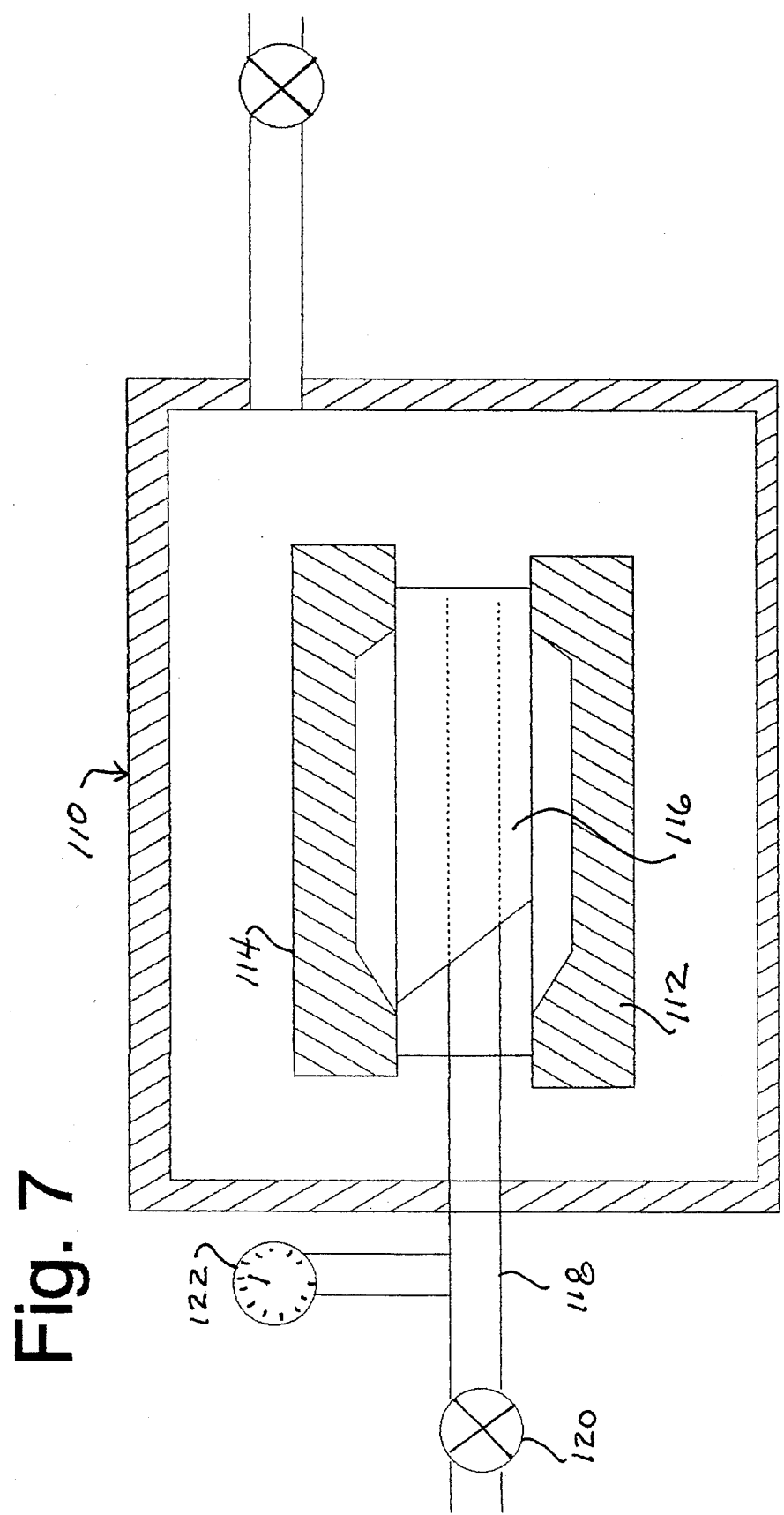
FIG. 7 is a cross-sectional view through the integral structure when positioned in the autoclave for the breaking of the adhesive bond and the superplastic forming steps.

During hot cracking, the integral structure is held between the superplastic forming split dies 112,114 as shown in FIG. 7 which are used in the subsequent superplastic forming step. The superplastic forming dies 112,114 are located in an autoclave 110. The autoclave 110 is evacuated so as to avoid contamination of the titanium structure and the dies 112,114 and the integral structure 116 are heated to superplastic forming temperature. A predetermined volume of high pressure argon or other inert gas, is then introduced into the second pipe 120 through a valve 118 and the decay of pressure in the second pipe 118 is observed to monitor the expansion due to the applied pressure. A pressure gauge 122 or other device is used to measure the pressure in the pipe 118. A rate of pressure decay of more than a predetermined value indicates that sufficient expansion has occurred in the gas channel 66,68,70 to facilitate subsequent superplastic expansion through application of further pressure pulses.

Completion of the forming of the integral structure into a component can now be achieved by the superplastic forming process.

If a hot crack operation has been carried out, the superplastic forming step can begin as soon as spaces defined by the inner walls of the dies and the outer walls of the integral structure are evacuated. Argon is introduced into the interior of the integral structure between the adjacent sheets, so as to force the outer sheets 42,46 into the respective die half shapes which generates an internal structure depending on the pattern of the applied stop off.

The second pipe is then connected to a vacuum pump which is used to evacuate the interior of the twisted integral structure and then inert gas, for example argon, is supplied to the interior of the twisted integral structure. This process of evacuating and supplying inert gas to the interior of the twisted integral structure may be repeated several times in order to ensure that most, or substantially all, traces of oxygen are removed from the interior of the integral structure. The particular number of times that the interior of the twisted integral structure is evacuated and purged with inert gas depends upon the size of the workpieces and upon the required integrity of the finished component. The inert gas is supplied to pressurise the interior of the twisted integral structure to atmospheric pressure.

If a cold crack operation has been carried out the twisted integral structure is placed between appropriately shaped split dies positioned within an autoclave. The autoclave is evacuated to avoid contamination of the titanium structure. The twisted integral structure is again heated to a temperature greater than 850° C., preferably between 900° C. and 950° C. In this example, the dies and twisted integral structure are heated to 925° C. Argon is introduced into the interior of the twisted integral structure between the adjacent sheets, so as to force the outer sheets 42,46 into the respective die half shapes which generates an internal structure depending on the pattern of the applied stop off.

The magnitude of the movement of at least one of the sheets during deformation, is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615–623 in the book *"The Science, Technology and Application of Titanium"* edited by R I Jaffe and N E Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the sheets.

Figure 6:
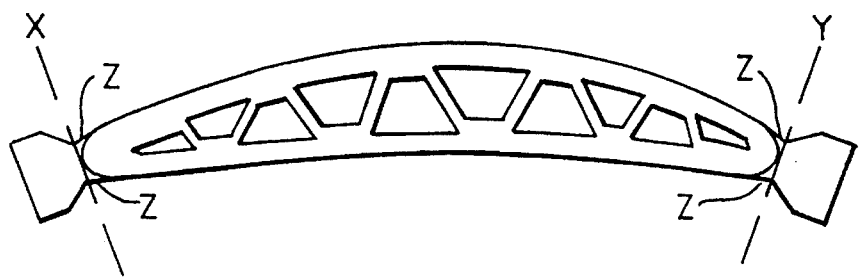
FIG. 6 is a cross-section through the integral structure after the diffusion bonding, cambering, twisting, isothermal forging and superplastic forming steps of the invention have been performed.

On completion of superplastic forming, the inert argon atmosphere within the twisted integral structure is maintained whilst the structure is cooled. The twisted integral structure is then machined in the regions of the grooves 76,80,92 and 96 to cut off the superfluous material as shown by lines X and Y in FIG. 6, and then the twisted integral structure is ground in the regions Z of the grooves 76,80,92 and 96 to produce the required leading and trailing edge shapes of the finished fan blade as shown in FIG. 6.

In an alternative method, the stack 40 is prepared in the same manner as described previously. The stack 40 is then placed in a vacuum chamber. The vacuum chamber is evacuated to evacuate the interior of the stack 40 and then inert gas, for example argon, is supplied to the vacuum chamber to purge the interior of the stack 40. This process of evacuating and supplying inert gas to the interior of the stack 40 may be repeated several times in order to ensure that most, or substantially all, traces of oxygen are removed from the interior of the stack 40. The particular number of times that the interior of the stack 40 is evacuated and purged with inert gas depends upon the size of the workpieces and upon the required integrity of the finished component. The inert gas is supplied to pressurise the interior of the vacuum chamber and stack 40 to atmospheric pressure.

The vacuum chamber and the interior of the stack 40 are then evacuated. The stack 40 is heated to a temperature between 250° C. and 350° C. to evaporate the binder from the stop off. During the baking out of the binder, the vacuum chamber is continuously evacuated to remove the binder from between the sheets and from the vacuum chamber. After the binder has been removed, the edges of the titanium sheets are welded together, for example by an electron beam, to provide a sealed assembly.

The sealed assembly is then transferred to an autoclave and the temperature in the autoclave is increased such that the sealed assembly is heated to a temperature greater than 850° C. and the argon pressure in the autoclave is raised to greater than 294 pounds per square inch ($20.26 \times 10^5$ Nm$^{-2}$) and held at that temperature and pressure for a predetermined time. Preferably the sealed assembly is heated to between 900° C. and 950° C. and the pressure is between 294 pounds per square inch and 441 pounds per square inch. The pressure is then reduced to ambient, diffusion bonding having been achieved and the sealed assembly, which is then an integral structure is removed.

Alternatively after the binder has been removed the titanium sheets may be diffusion bonded together without the need to weld the edges of the titanium sheets.

Following diffusion bonding the integral structure is processed in the same manner as described previously.

In a preferred method following the cambering and twisting of the integral structure to produce a twisted, or contoured, integral structure, the pipe 72 is removed and a second pipe is fitted to the twisted integral structure. Argon is introduced into the areas, within the twisted integral structure, containing the stop off in order to break the adhesive grip which the diffusion bonding pressure has brought about. This may again be a hot or cold cracking technique. The second pipe is connected to a vacuum pump which is used to evacuate the interior of the twisted integral structure and then inert gas is supplied to the interior of the twisted integral structure. This process is repeated several times to remove substantially all traces of oxygen from the interior of the twisted integral structure.

If the cold cracking technique is used the twisted integral structure is then placed between combined forging and superplastic forming dies in an autoclave. The twisted integral structure and dies are heated to a suitable temperature, for example 920° C., for titanium and a suitable pressure of up to 1 ton per square inch is applied by the dies on the twisted integral structure to isothermally form the leading and trailing edges of the fan blade. Immediately following the forging step the dies and twisted integral structure are maintained at a temperature between 900° C. and 950° C. and argon is introduced into the interior of the twisted integral Structure to superplastically form the twisted integral structure to fit the die half shapes and to generate an internal structure depending on the pattern of the stop off.

If the hot cracking technique is used, the twisted integral structure may already have been placed between the combined forging and superplastic forming dies in an autoclave. In this instance, it is merely necessary to apply pressures of up to 1 ton per square inch to isothermally form the leading and trailing edges of the fan blade. This is immediately followed by the superplastic forming of the twisted integral structure to fit the die half shapes and to generate an internal structure depending on the pattern of the stop off. The advantage of this method is that the hot cracking isothermal forging and superplastic forming steps are all performed in a common die at a common processing temperature. Alternatively the isothermal forming step may precede the hot cracking step.

Although the description has referred to machining grooves on both the first and third sheets it is possible to machine the grooves on only one of the first or third sheets. It is also possible to machine a central region on only one of the first or third sheets.

Although the description has referred to titanium sheets or titanium workpieces, the present invention is equally applicable to workpieces of other elementary metals, metal alloys, metal matrix composites and intermetallic materials which are diffusion bondable and one of the workpieces must be capable of superplastic extension. Aluminium and stainless steel are capable of superplastic extension at suitable temperatures and pressures.

The method is suitable for manufacturing fan blades, fan duct outlet guide vanes, compressor blades or compressor vanes for gas turbine engines.

Although the description has referred to a stack of three sheets it is possible to use stacks comprising two sheets or stacks comprising four or more sheets depending upon the particular article to be manufactured. In the case of two sheets, the sheets may be hot formed rather than superplastically formed.

The invention has been described with reference to solid state diffusion bonding in which the interface between the workpieces effectively disappears, however in circumstances in which the diffusion bond between the workpieces does not need to be as strong as a solid state diffusion bond it is possible to use activated diffusion bonding. In activated diffusion bonding an activator, such as a metal foil, is placed between the surfaces to be bonded. During the bonding process the activator material, upon reaching a certain temperature, transiently forms a liquid phase which, forms an alloy with the workpieces. This immediately solidifies to form the bond.

One advantage of this superplastic forming and diffusion bonding method is that it produces aerofoil shapes of fan blades, or fan duct outlet guide vanes, which are very close to the final required size and shape. Only a small amount of machining is required, at the leading and trailing edge regions, to produce the finished article.

A further advantage of this method is that the dimensional checks are performed on the grooves in the sheets/workpieces after the workpieces have been machined, and before the workpieces have been diffusion bonded and superplastically formed, to detect none conformance rather than dimensional checks after final machining.

We claim:

1. A method of manufacturing an article by superplastic forming and diffusion bonding at least two workpieces comprising the steps of:

(a) forming a first workpiece which has a flat surface, (b) forming a second workpiece which has a flat surface, the first and second workpieces defining the outer profile of the finished article, (c) machining a portion of a surface of at least the first workpiece at a predetermined distance from at least a portion of the periphery of the first workpiece, the said surface being opposite to the flat surface of the first workpiece, (d) applying a stop off material to prevent diffusion bonding to preselected areas of at least one of the flat surfaces of at least one of the at least two workpieces, (e) assembling the at least two workpieces into a stack relative to each other so that the flat surfaces are in mating abutment, (f) applying heat and pressure across the thickness of the at least two workpieces to diffusion bond the at least two workpieces together in areas other than the preselected areas to form an integral structure, (g) heating the internal structure to a temperature at which the metal is plastic and internally pressurising the integral structure to break the adhesive bond between the stop off material and the the at least one workpiece in the preselected areas and applying heat and pressure to the integral structure to isothermally forge the machined portion on the first workpiece which forms part of the integral structure to substantially produce the required finished peripheral shape and dimensions of the finished article, (h) heating the integral structure and internally pressurising it to cause the preselected areas of at least one of the workpieces to be superplastically formed to produce an article of predetermined shape, (i) finish machining the article to remove excess material from the isothermally forged peripheral shape to produce the finished article.

2. A method as claimed in claim 1 further comprising machining a portion of a surface of the second workpiece at a predetermined distance from at least a portion of the periphery of the second workpiece, the said surface being opposite to the flat surface of the second workpiece, applying heat and pressure on the integral structure to isothermally forge the machined portions on the first and second workpieces which form part of the integral structure to substantially produce the required finished peripheral shape and dimensions of the finished article.

3. A method as claimed in claim 1 wherein after diffusion bonding the stack of workpieces and before internally pressurising to break the adhesive bond, heating the integral structure and applying loads to opposite ends of the integral structure to twist one end relative to the other end to contour the integral structure to a predetermined shape.

4. A method as claimed in claim 3 wherein after internally pressurising the integral structure to break the adhesive bond and before internally pressurising the integral structure to superplastically form at least one workpiece, sequentially evacuating and supplying inert gas to the interior of the integral structure to remove oxygen from the interior of the integral structure.

5. A method as claimed in claim 4 wherein the step of sequentially evacuating and supplying inert gas to the interior of the integral structure to remove oxygen is performed a plurality of times.

6. A method as claimed in claim 1 wherein the breaking of the adhesive bond, the isothermal forging and superplastic forming steps are performed in a single die.

7. A method as claimed in claim 1 wherein step (g) includes applying heat and pressure to the integral structure to isothermally forge the integral structure before internally pressurising the integral structure to break the adhesive bond.

8. A method as claimed in claim 1 wherein step (g) includes internally pressurising the integral structure to break the adhesive bond before applying heat and pressure to the integral structure to isothermally forge the integral structure.

9. A method of manufacturing an article by superplastic forming and diffusion bonding at least two workpieces comprising the steps of:

(a) forming a first workpiece which has a flat surface, (b) forming a second workpiece which has a flat surface, the first and second workpieces defining the outer profile of the finished article, (c) machining a portion of a surface of at least the first workpiece at a predetermined distance from at least a portion of the periphery of the first workpiece, the said surface being opposite to the flat surface of the first workpiece, (d) applying a stop off material to prevent diffusion bonding to preselected areas of at least one of the flat surfaces of at least one of the at least two workpieces, (e) assembling the at least two workpieces into a stack relative to each other so that the flat surfaces are in mating abutment, (f) sealing the edges of the at least two workpieces together, except where a pipe is to be inserted, and joining a pipe to the stack to provide a sealed assembly, (g) sequentially evacuating the interior of the sealed assembly and supplying inert gas to the interior of the sealed assembly through the pipe to remove oxygen from the interior of the sealed assembly, (h) placing the sealed assembly in an oven while continuously evacuating the sealed assembly, (i) heating the sealed assembly while it is within the oven to evaporate volatile binder from the stop off material while continuously evacuating the sealed assembly to remove the volatile binder from between the at least two workpieces of the sealed assembly, (j) sealing the pipe, (k) applying heat and pressure across the thickness of the at least two workpieces to diffusion bond the at least two workpieces together in areas other than the preselected areas to form an integral structure, (l) heating the integral structure to a temperature at which the metal is plastic and internally pressurising the integral structure to break the adhesive bond between the stop off material and the at least one workpiece in the preselected areas and applying heat and pressure to the integral structure to isothermally forge the machined portion on the first workpiece which forms part of the integral structure to substantially produce the required finished peripheral shape and dimensions of the finished article, (m) heating the integral structure and internally pressurising it to cause the preselected areas of at least one of the workpieces to be superplastically formed to produce an article of predetermined shape, (n) finish machining the article to remove excess material from the isothermally forged peripheral shape to produce the finished article.

10. A method as claimed in claim 9 further comprising machining a portion of a surface of the second workpiece at a predetermined distance from at least a portion of the periphery of the second workpiece, the said surface being opposite to the flat surface of the second workpiece, applying heat and pressure on the integral structure to isothermally forge the machined portions on the first and second workpieces which form part of the integral structure to substantially produce the required finished peripheral shape and dimensions of the finished article.

11. A method as claimed in claim 9 wherein after diffusion bonding the stack of workpieces and before internally pressurising the contoured structure to break the adhesive bond, the integral structure is heated and loads are applied to opposite ends of the integral structure to twist one end relative to the other end to contour the integral structure to a predetermined shape.

12. A method as claimed in claim 9 wherein before the pipe is sealed, cooling the sealed assembly whilst the sealed assembly is continuously evacuated.

13. A method as claimed in claim 11 wherein after internally pressurising the integral structure to break the adhesive bond and before internally pressurising the integral structure to superplastically form at least one workpiece, sequentially evacuating and supplying inert gas to the interior of the integral structure to remove oxygen from the interior of the integral structure.

14. A method as claimed in claim 13 wherein the step of sequentially evacuating and supplying inert gas to the interior of the integral structure to remove oxygen is performed a plurality of times.

15. A method as claimed in claim 9 comprising welding the edges of the workpieces together.

16. A method as claimed in claim 9 wherein the step of sequentially evacuating the interior of the sealed assembly and supplying inert gas to the interior of the sealed assembly through the pipe to remove oxygen from the interior of the sealed assembly is performed a plurality of times.

17. A method as claimed in claim 9 wherein where the workpieces are made of a titanium alloy, heating the workpieces to a temperature equal to, or greater than, 850° C. and applying a pressure equal to, or greater than, $20 \times 10^5$ Nm$^{-2}$ to diffusion bond the workpieces together to form an integral structure.

18. A method as claimed in 17 wherein the workpieces are heated to a temperature between 900° C. and 950° C. and the pressure applied is between $20 \times 10^5$ Nm$^{-2}$ and $30 \times 10^5$ Nm$^{-2}$.

19. A method as claimed in claim 9 wherein the integral structure is heated to a temperature equal to, or greater than, 850° C. to superplastically form the integral structure.

20. A method as claimed in claim 19 wherein the integral structure is heated to a temperature between 900° C. and 950° C.

21. A method as claimed in claim 11 wherein the integral structure is heated to a temperature of 800° C. for twisting the opposite ends of the integral structure.

22. A method as claimed in claim 11 wherein before the opposite ends of the integral structure are twisted the integral structure is heated and a load is applied to one end of the integral structure to camber said end.

23. A method as claimed in claim 11 comprising holding one end of the integral structure stationary and rotating the other end of the integral structure to twist the integral structure.

24. A method as claimed in claim 9 wherein the integral structure is heated to a temperature of 920° C. and is isothermally forged at a pressure of up to $16 \times 10^6$ Nm$^{-2}$.

25. A method as claimed in claim 9 wherein the machining of the surfaces of the first, or second, workpieces comprises milling, electrochemical machining, chemical machining or electro discharge machining.

26. A method as claimed in claim 9 wherein the finish machining comprises cutting and finish grinding.

27. A method as claimed in claim 9 wherein the article is a vane manufactured from two workpieces by machining a first portion of the first workpiece at a predetermined distance from a first edge of the first workpiece, machining a second portion of the first workpiece at a predetermined distance from a second opposite edge of the first workpiece, machining a first portion of the second workpiece at a predetermined distance from a first edge of the second workpiece, machining a second portion of the second workpiece at a predetermined distance from a second opposite edge of the second workpiece, assembling the first and second workpieces into a stack such that the flat surfaces are in abutment and the first edges of the workpieces are adjacent each other, the first edges of the workpieces correspond to the leading edge of the vane and the second edges of the workpieces correspond to the trailing edge of the vane.

28. A method as claimed in claim 9 wherein the article is a blade manufactured from three workpieces by machining a first portion of the first workpiece at a predetermined distance from a first edge of the first workpiece, machining a second portion of the first workpiece at a predetermined distance from a second opposite edge of the first workpiece, machining a first portion of the second workpiece at a predetermined distance from a first edge of the second workpiece, machining a second portion of the second workpiece at a predetermined distance from a second opposite edge of the second workpiece, assembling the first, second and third workpieces into a stack such that the flat surface of the first workpiece is in abutment with one flat surface of the third workpiece and the flat surface of the second workpiece is in abutment with an opposite flat surface of the third workpiece, the first edges of the workpieces are adjacent each other, the first edges of the workpieces correspond to the leading edge of the blade and the second edges of the workpieces correspond to the trailing edge of the blade.

29. A method as claimed in claim 9 wherein the article is a vane manufactured from two workpieces by machining a first portion of the first workpiece at a predetermined distance from a first edge of the first workpiece, machining a second portion of the first workpiece at a predetermined distance from a second opposite edge of the first workpiece, assembling the first and second workpieces into a stack such that the flat surfaces are in abutment and the first edge of the first workpiece corresponds to the leading edge of the vane and the second edge of the first workpiece corresponds to the trailing edge of the vane.

30. A method as claimed in claim 9 wherein the article is a blade manufactured from three workpieces by machining a first portion of the first workpiece at a predetermined distance from a first edge of the first workpiece, machining a second portion of the first workpiece at a predetermined distance from a second opposite edge of the first workpiece, assembling the first, second and third workpieces into a stack such that the flat surface of the first workpiece is in abutment with one flat surface of the third workpiece and the flat surface of the second workpiece is in abutment with an opposite flat surface of the third workpiece, the first edge of the first workpiece corresponds to the leading edge of the blade and the second edge of the first workpiece corresponds to the trailing edge of the blade.

31. A method as claimed in claim 9 comprising machining the first or second workpiece centrally of the surface opposite to the flat surface to vary the mass distribution of the first or second workpiece.

32. A method as claimed in claim 9 comprising performing the breaking of the adhesive bond, the isothermal forging and superplastic forming steps in a single die.

33. A method as claimed in claim 9 wherein step (l)

comprises internally pressurising the integral structure to break the adhesive bond between the stop off material and the the at least one workpiece in the preselected areas before applying heat and pressure to the integral structure to isothermally forge the integral structure.

34. A method as claimed in claim 9 wherein step (l) comprises applying heat and pressure to the integral structure to isothermally forge the integral structure before internally pressurising the integral structure to break the adhesive bond between the stop off material and the at least one workpiece in the selected areas.

35. A method as claimed in claim 12 comprising cooling the sealed assembly to ambient temperature.

36. A method of manufacturing an article comprising the steps of:
  (a) producing a plurality of stackable workpieces comprising at least first and second workpieces, the first and second workpieces each having at least one flat surface and a surface intended to form the outside of the finished article, any further workpieces in said plurality of workpieces having two flat surfaces for abutting flat surfaces on the other workpieces,
  (b) machining at least a portion of at least one of the surfaces intended to form the outside of the finished article to predefine an edge portion of the finished article,
  (c) applying a stop off material to preselected areas of preselected flat surfaces of the workpieces,
  (d) assembling the workpieces into a stack so that the flat surfaces of adjacent workpieces are in mating abutment,
  (e) applying heat and pressure across the stack of workpieces to diffusion bond the workpieces together in areas of the flat surfaces other than the preselected areas where the stop off was applied, thereby forming an integral structure,
  (f) heating the integral structure to a temperature at which the metal is plastic and internally pressurising the integral structure to break the adhesive bond between the stop off material and the at least one workpiece in the preselected areas and applying heat and pressure to the integral structure to isothermally forge the machined portion on the at least one of the surfaces of the Workpieces intended to form the outside of the finished article which form part of the integral structure to substantially produce the required finished peripheral shape and dimensions of the finished article,
  (g) heating the integral structure and internally pressurising it to cause the preselected areas of at least one of the workpieces to be superplastically formed to produce an article of predetermined shape,
  (i) finish machining the article to remove excess material from the isothermally forged peripheral shape to produce the finished article.

* * * * *